United States Patent

Coleman et al.

[15] 3,675,064

[45] July 4, 1972

[54] DIRECTED EMISSION LIGHT EMITTING DIODE

[72] Inventors: Michael G. Coleman; Tommie R. Huffman, both of Tempe, Ariz.

[73] Assignee: Motorola, Inc., Franklin Park, Ill.

[22] Filed: Feb. 16, 1970

[21] Appl. No.: 11,573

[52] U.S. Cl. ....................313/108 D, 317/234 R, 317/235 N, 313/114, 317/237

[51] Int. Cl. ......................................H05b 33/02, H01z 3/14

[58] Field of Search ...................313/108, 114; 317/235, 237

[56] References Cited

UNITED STATES PATENTS

| | | | |
|---|---|---|---|
| 3,534,179 | 10/1970 | Vitkus | 313/108 |
| 3,404,304 | 10/1968 | Bouin | 313/108 |
| 3,427,516 | 2/1969 | Antell | 317/237 |
| 3,290,539 | 12/1966 | Lamorte | 313/114 |
| 3,443,140 | 6/1969 | Ing | 313/108 |
| 3,343,026 | 9/1967 | Luechinger | 313/108 |
| 3,257,626 | 6/1966 | Marinace | 313/108 |

*Primary Examiner*—Herman Karl Saalbach
*Assistant Examiner*—C. Baraff
*Attorney*—Mueller & Aichele

[57] ABSTRACT

Semiconductor light sources comprising PN junctions in which the PN junctions project the light they produce in a desired direction. This is accomplished by positioning one or more PN junctions in a plane parallel to the desired direction.

12 Claims, 10 Drawing Figures

INVENTOR.
Michael G. Coleman
Tommie R. Huffman
BY
Mueller, Aichele & Rauner
ATTY'S

DIRECTED EMISSION LIGHT EMITTING DIODE

BACKGROUND

It is known that a PN junction in many materials, some of which are GaAs, GaP, $GaAs_{1-x}P_x$, $Ga_xAl_{1-x}As$, and $Ga_xIn_{1-x}P$, produce light when a forward electrical bias is provided across the PN junction. This light is produced at or very near the junction itself. In many known PN junctions which produce light as described, the P and the N materials more or less absorb the produced light. Furthermore, the index of refraction of most known materials capable of producing light with PN junctions as described is very high, requiring that light generated as described strike an external surface of the material containing the PN junction more or less perpendicularly to said external surface to escape from the material. Therefore, less light comes out of the material which contains the PN junction than is created within the material, with much of the light either being absorbed initially by the material or internally reflected and re-reflected at the external surfaces of the material until it is finally absorbed within the material. Light may most favorably be transmitted external to the material containing the PN junction in most known cases at the intersection of the PN junction with an external surface of the material containing the PN junction. This is due to the differences in absorption coefficients for the light and differences of indexes of refraction between the P material, the N material and the depletion region surrounding the PN junction, as well as other considerations. For example, light in the depletion region of the PN junction may not be transmitted into the neighboring P and N material but the depletion region may act as a wave guide for this light whereby it travels along the depletion region to the external surface.

It is an object of this invention to provide an improved light source including at least one PN junction.

It is an object of this invention to provide a light source in which more of the light that is produced by a PN junction is usable for signaling or illumination than in known devices.

It is another object of this invention to provide a light source comprising a PN junction in which the light produced is predominately directed in one direction.

SUMMARY

In accordance with the invention, a light producing PN junction or junctions are so arranged that more of the light produced thereby is directed in the same direction, than in known devices. When only a single PN junction is used, the junction is so formed and positioned that the exposed edges thereof extend through or intersect the surface of the material including the junction and parallel straight lines can be drawn into and parallel to the plane containing the junction or the part of the junction which intersects said surface. If more than one PN junction is provided, the lines that are drawn into said junctions extend parallel to the plane of the junctions or the parts of the junctions that intersect such surfaces. The length of the PN junction or junctions through the surface of the material may be lengthened by making the intersection of the PN junction with the surface of the material other than a straight line.

THE DRAWINGS

The invention may be better understood upon reading the following description in connection with the accompanying drawing in which.

DESCRIPTION

In the following description of the several embodiments, the method by which the several embodiments are made or the material of which the several embodiments are made may be any known convenient method or any known suitable material. For example, excavations may be made by etching or cutting or, the article may be cast in a semifinished form. The materials may be GaAs, GaP, $Ga_xAl_{x-1}As$, $GaAs_{1-x}P_x$, $Ga_xIn_{x-1}P$, or any semiconductor which includes a PN junction that emits light when properly energized. Therefore, in the following description, where an embodiment is said to be made in any way, it is to be understood that the embodiment may be made in another known manner.

Figure 1:
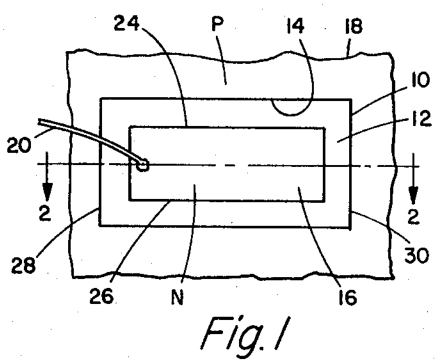
FIG. 1 is a plan view of a portion of a light emitting diode in accordance with the invention.
Figure 2:
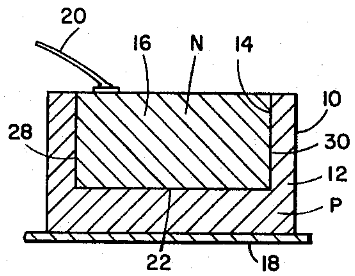
FIG. 2 is a cross-sectional view taken along line 22 of FIG. 1.

Referring first to FIGS. 1 and 2, a block 10 of suitable P type (for example) semiconductor material 12 is provided having a hole 14 therein filled with suitable N type semiconductor material 16. Obviously, the block may be of N type material and the filling of the hole therein may be of P type material if desired. The depth of the hole 14 may be at least 1 mil which is many times as deep as the thickness of the layer of opposite conductivity type which is formed in the surface of the semiconductor material of one type in providing a transistor or a rectifying diode. Therefore, the vertical extent of the PN junction in the embodiment of FIGS. 1 and 2 is many times as great as if a rectifying diode or a transistor were provided. The bottom of the block 10 may be connected ohmically to an electrode 18 which here takes the form of a bottom plate and a wire 20 may be connected ohmically to the N material 16 in a known manner. Upon application of the proper voltage, in a known manner, across the PN junction formed by the P material 12 and the N material 16, light will be produced along the whole extent of the PN junction. A portion of the light produced by the bottom 22 of the PN junction may be absorbed by the material 12 and 16. However, much of the light produced by the four sides 24, 26, 28 and 30 will be emitted in a direction perpendicular to the top surface as viewed in FIGS. 1 and 2 of the block 10, the depletion area surrounding the PN junction itself acting as a wave guide for the light produced. The corners between the bottom portion of the PN junction 22 and the side portions 28 and 30 will prevent most of the light that is travelling along the plane of the PN junction 22 from getting out of the block 10. However, some of the light in the PN junction 22 will travel out of the PN junction 22 in a direction perpendicular thereto. The light produced by the side portions 24, 26, 28 and 30 extends away in parallel directions to augment the useful light produced and therefore to increase the efficiency as a light producing means of the block 10 over prior art rectifying diode and transistor structure.

Figure 3:
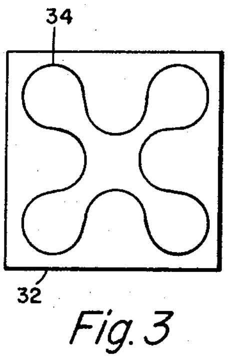
FIG. 3 is a plan view of a further embodiment of the invention.

As noted above, the vertical surfaces produce most of the usable light in the light producing structure of FIGS. 1 and 2. The amount of light produced can be further increased by increasing the extent of the vertical portion of the PN junction by giving the PN junction a meandering direction. Such a light producing device 32 is shown in FIG. 3. The PN junction 34 is given a rosette-like form when viewed in a direction perpendicular to the surface through which the PN junction 34 extends. The walls of the PN junction 34 are all perpendicular to the illustrated surface of the device 32. The walls may be at least 1 mil high and be joined by a bottom PN junction (not shown). In this manner, a greater length of PN junction extends through the surface of the device 32 in FIG. 3 than if the junction 34 took a rectangular form, whereby more light is produced by the device of FIG. 3. The rosette form illustrated in FIG. 3 is of course exemplary only of the many meandering forms that the PN junction 34 may take.

Figures 4, 5, 6, 7, 8, 9, 10:
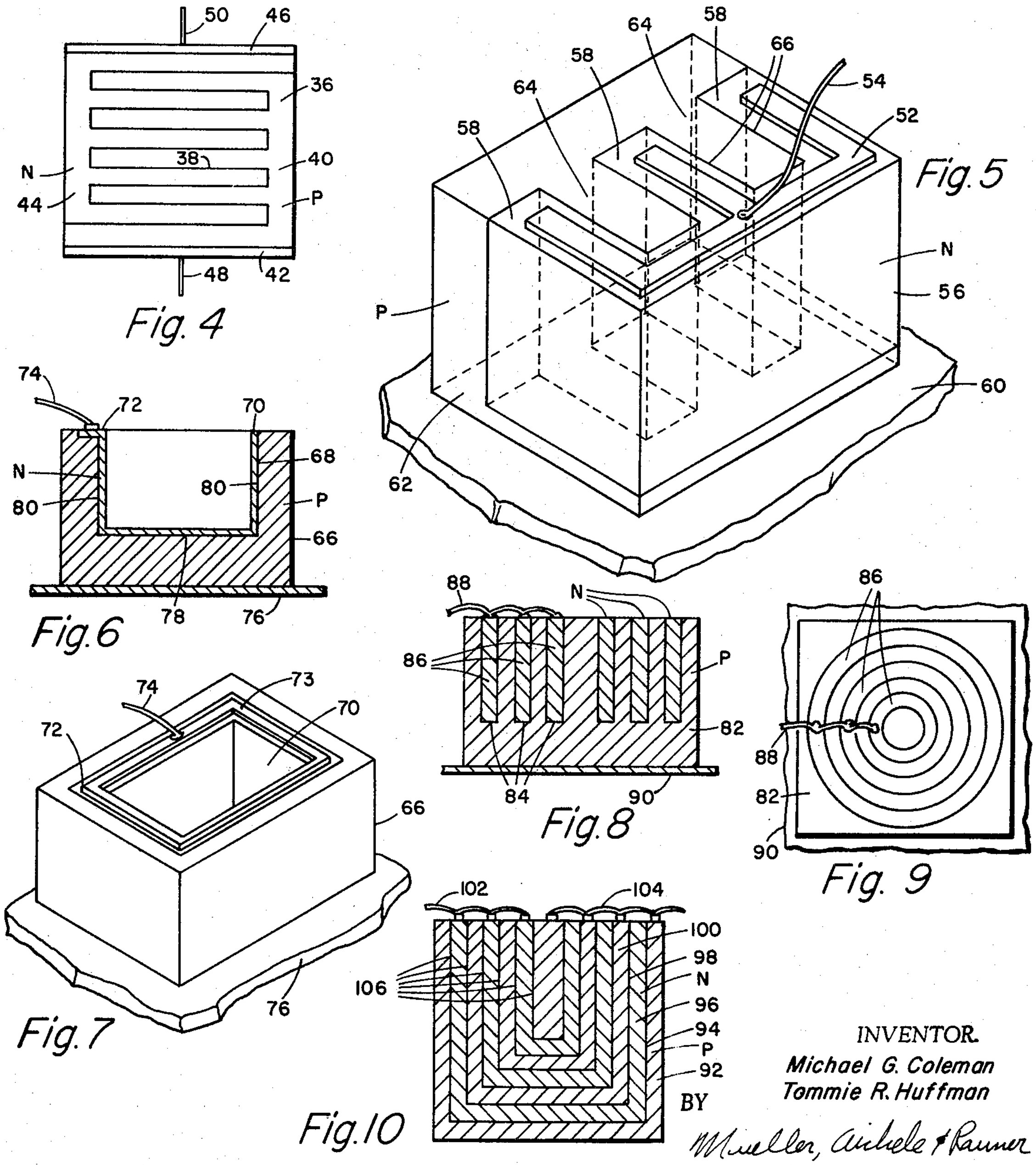
FIG. 4 is a plan view of another embodiment of the invention.
FIG. 5 is a perspective view of a light emitting diode in accordance with a further embodiment of the invention.
FIGS. 6 and 7 are a cross-sectional view and a perspective view of yet another embodiment in accordance with the invention.
FIGS. 8 and 9 are a cross-sectional view and a plan view of still another embodiment of light emitting diode in accordance with the invention.
FIG. 10 is a cross-section of a light emitting diode in accordance with a further embodiment of the invention.

FIG. 4 discloses a light source 36 including a PN junction which extends over a meandering path. The light source 36 includes a P portion 40 having an electrode 42 in ohmic contact therewith and an N portion 44 having an electrode 46 in contact therewith. Lead wires 48 and 50 may be connected respectively with the electrodes 42 and 46. The N portion 44 and the P portion 40 are so formed that they fit in an interdigitated manner to provide the PN junction 38. This junction 38 extends through the depth of the structure of FIG. 4. The elongated PN junction 38 provides light throughout its length when properly energized and the light for the most part is directed in a direction perpendicular to the face of the light source 36.

It will be noted that if one of the electrodes 42 or 46 is fixed to and parallel with a mounting surface, instead of having the wire 48 or 50 attached thereto as shown, then, the emitted light would be directed parallel to the mounting surface. Such direction of emitted light may be inconvenient. The structure of FIG. 4 may be modified to cause the light producing structure to emit light in a direction perpendicular to the mounting surface. Such modified structure is shown in FIG. 5. The electrode 52, to which a wire 54 is connected, is in ohmic contact with N material 56. Digits 58 of N material, which may be of plate form, extend to the left as viewed in FIG. 5. An electrode 60, which may also be a mounting plate, is ohmically connected to a slab 62 of P material. Digits 64 of P material extend to the right and are interdigitated with the digits 58 to form an elongated PN junction 66 which intersects the top surface, that is, the surface away from the electrode 60, of the structure of FIG. 5. The light is therefore directed away from the supporting electrode 60. If desired, the slab 62 of P material may extend also along the other edges of the figure to cut down emission of light in a direction parallel to the electrode 60. While the dimensions of the light source of FIG. 5 in a direction away from the electrode 60 have been shown as being about equal to the dimensions of the light source in a right and left direction, the dimensions in the direction away from the electrode 60 may be made shorter if desired.

In FIG. 6, a block 66 of P material may have a hole 68 provided therein and a thin layer 70 of N material may be provided on the inside surface of the hole 68, a small amount of N material 72 being provided along the margin of the P material 66 to support a bonding pad for a lead wire. The material 66 may be mounted on an electrode 76. The depth of the hole 68 may be many times, 25 times for example, as thick as the N coating 70. In this construction of FIG. 6, some of the light produced by the PN junction 78 forming part of the bottom of the hole 68 is utilized. Some of this light gets through the layer 78 and is emitted in the direction essentially perpendicular to the bottom surface of the hole 68 and reinforces the light emitted by the vertical portion 80 of the PN junction. The bonding pad, which is made as small as practical, may be necessary to provide a connection to the layer 70 since this layer 70 may be in the order of a micron thick.

A modification of the embodiment of FIG. 6 is shown in FIG. 7. The parts of FIGS. 6 and 7 which are similar have the same reference characters. The light source of FIG. 7 differs from the light source of FIG. 6 in that the layer 70 extends all around the upper surface of the block 66 as shown at 72 permitting the use of a large bonding pad 73. As shown, the bonding pad 73 is positioned back of the inner edge of the hole in the block 66 so as not to block any light produced at the PN junction (not shown in FIG. 7) and extends entirely around the hole in the block 66. The distance of the setback of the bonding pad 73 is the thickness of the depletion layer of the PN junction. The wire 74 is connected to the bonding pad 73. Use of such a bonding pad 73 causes more equal energization of the PN junction of FIG. 7 than of FIG. 5.

Two further embodiments of light sources having PN junctions, all of which intersect one surface of the light source, are shown in FIGS. 8 and 9 for one embodiment and in FIG. 10 for the other embodiment.

In FIGS. 8 and 9, a block 82 of P material has cylindrical grooves 84 cut therein. As shown, the block 82 may be square and the grooves 84 may be coaxial with the axis of the square block 82. The grooves 84 are filled with N material 86 whereby a plurality of concentric PN junctions are provided, all of which intersect the upper surface of the cylinder 82. A wire 88 provides ohmic contact to the N material 86 and a mounting plate 90 provides ohmic contact to the P material 82. The depth of the grooves 84 may be at least 1 mil. Essentially, all light produced by the light source of FIG. 8 is emitted in a direction perpendicular to the electrode 90.

In FIG. 10, a block 92 of P material may have a hole 94 cut therein and a thin layer 96 of N material may be provided on the inside of the hole 92 leaving a smaller hole 98. A thin layer 100 of P material may be provided on the inside of the hole 98, and the process may be continued by providing alternate layers of P and N material until the hole is filled up if desired. A lead 102 is ohmically connected to all the P layers and a lead 104 is ohmically connected to all the N layers, whereby the required energizing current may be provided for the several PN junctions 106 so produced. In this FIG. 10, all the exposed ends of the PN junctions 106 intersect one surface only of the light source, whereby most of the produced light will be emitted in the same direction. Of course, if desired, the light source of FIG. 10 may be produced by providing a rod of semiconductive material of one type and applying alternate coating of N and P types of materials on it and grinding off one surface of the resulting structure to expose the ends of the so produced PN junctions, instead of working from the outside as is described above.

Furthermore, in FIGS. 8, 9 and 10, the block 82 of FIG. 8 or 92 of FIG. 10 need not be of the shapes shown but may take any desired shapes and the grooves therein need not be cylindrical but may also take any shape including intersecting shapes.

The PN junctions in any of the above disclosed embodiments of this invention may be provided in any known manner as by diffusion, alloying or epitaxial deposition.

The above disclosed light sources have the following advantages over prior art light sources:

1. Improved light yield in a desired direction as compared to the total light produced.

2. The light produced will be highly concentrated as distinct from the diffused light produced by prior art devices.

3. The listed advantages are provided with known and conventional packaging techniques.

What is claimed is:

1. A light emitting diode comprising a wafer of semiconductor material of one conductivity type, said wafer having a planar top surface and a planar bottom surface; a mounting plate electrode secured to said bottom planar surface; a hole in said top surface; said hole being at least one and a half mils deep, having side walls everywhere perpendicular to said planar top surface, and a bottom wall substantially parallel to said mounting plate electrode; the inner surface of said hole comprising semi-conductor material of the other conductivity type and forming a PN junction therewith; the area of the PN junction in the side walls of the cavity being substantially larger than the area of PN junction in the bottom wall area whereby when a forward electrical bias is provided across the PN junction the majority of light is produced along the side walls and emitted at said planar top surface.

2. The invention of claim 1 in which said material of the other conductivity type at least partially fills said hole.

3. The invention of claim 1 in which said material of the other conductivity type is so thin that it is at least partially transparent to the light produced by said PN junction when properly energized.

4. The invention of claim 1 in which said hole is at least partially filled with alternate contacting layers of semiconductive materials of the two conductivity types.

5. The invention of claim 4 in which respective electrical connections are provided between the several layers of the same conductivity type.

6. The invention of claim 3 in which a bonding pad of said other conductivity type extends along said surface of said body and integral with said material of said other conductivity type.

7. A light source comprising
a number of digits of one conductivity type,
a number of digits of the other conductivity type,
several of said digits being interdigitated such that the junctions formed by said interdigitation are perpendicular to the emitting surface of said light source, said junction being highly defined,
an electrode in electrical contact with said digits of said one conductivity type and
an electrode in electrical contact with said digits of said other conductivity type, whereby an elongated PN junction intersects a surface of said light source, said PN junction extending at least one and a half mils in a direction perpendicular to said surface.

8. The invention of claim 7 in which one of said electrodes extends parallel to said surface.

9. The invention of claim 7 in which said contacts extend parallel to each other.

10. A light emitting diode source comprising a piece of semiconductive material of one conductivity type having a top planar surface and a bottom planar surface; a plurality of discrete grooves formed in said top planar surface, said grooves having side walls perpendicular to said top planar surface; the inner surface of said plurality of grooves comprising semiconductive material of the other conductivity type whereby a plurality of PN junctions are formed in said piece of semiconductive material with the major area of the junctions being in the side walls; an ohmic electrical connector between the semiconductive material of the other conductivity type and a mounting plate electrode secured to said bottom planar surface.

11. The invention of claim 10 in which said material of said other conductivity type substantially fills said groove.

12. The invention of claim 10 in which said grooves are at least one and a half mils deep.

* * * * *